US009621762B2

(12) United States Patent
Chandu et al.

(10) Patent No.: US 9,621,762 B2
(45) Date of Patent: Apr. 11, 2017

(54) HALFTONE CALIBRATION MECHANISM EMPLOYING AN INK MODEL

(75) Inventors: Kartheek Chandu, Longmont, CO (US); Larry Ernst, Longmont, CO (US); Sreenath Rao Vantaram, Rochester, NY (US); Mikel J. Stanich, Longmont, CO (US); Chai Wah Wu, Hopewell Junction, NY (US)

(73) Assignee: Ricoh Company, Ltd., Tokyo (JP)

( * ) Notice: Subject to any disclaimer, the term of this patent is extended or adjusted under 35 U.S.C. 154(b) by 1233 days.

(21) Appl. No.: 13/346,231

(22) Filed: Jan. 9, 2012

(65) Prior Publication Data

US 2013/0176600 A1 Jul. 11, 2013

(51) Int. Cl.
*G06K 15/00* (2006.01)
*H04N 1/405* (2006.01)
*H04N 1/407* (2006.01)

(52) U.S. Cl.
CPC ............. *H04N 1/405* (2013.01); *H04N 1/407* (2013.01)

(58) Field of Classification Search
CPC ................................ H04N 1/405; H04N 1/407
See application file for complete search history.

(56) References Cited

U.S. PATENT DOCUMENTS

| 5,936,741 | A | * | 8/1999 | Burns | 358/1.9 |
| 7,321,448 | B2 | | 1/2008 | Nishida et al. | |
| 7,791,760 | B2 | | 9/2010 | Shimada | |
| 2002/0171852 | A1 | * | 11/2002 | Zhang et al. | 358/1.9 |
| 2003/0048464 | A1 | | 3/2003 | Yamada et al. | |
| 2003/0128378 | A1 | * | 7/2003 | Cooper et al. | 358/1.9 |
| 2003/0164960 | A1 | * | 9/2003 | Housel | 358/1.9 |
| 2004/0145758 | A1 | | 7/2004 | Lamy et al. | |
| 2006/0012809 | A1 | | 1/2006 | Shimada | |
| 2007/0171247 | A1 | * | 7/2007 | Kitagawa | 347/15 |
| 2010/0110461 | A1 | | 5/2010 | Hallam | |
| 2010/0245867 | A1 | * | 9/2010 | Murata | 358/1.9 |
| 2011/0013210 | A1 | | 1/2011 | Yamaguchi | |
| 2012/0069357 | A1 | * | 3/2012 | Yao | 358/1.9 |

OTHER PUBLICATIONS

Vrhel, M.J. , et al., "Color Device Calibration: A Mathematical Formulation", *IEEE Transactions on Image Processing*, 8(12), (Dec. 1999), 1796-1806.

* cited by examiner

*Primary Examiner* — Quang N Vo
(74) *Attorney, Agent, or Firm* — Blakely, Sokoloff, Taylor & Zafman LLP (57) ABSTRACT

A printing system is disclosed. The printing system includes a halftone calibration system that receives one or more un-calibrated halftones, generates one or more calibrated halftones using an ink model from the one or more un-calibrated halftones, analyzes a printed calibration screen of the one or more calibrated halftones, and performs a halftone calibration.

18 Claims, 9 Drawing Sheets

HALFTONE CALIBRATION MECHANISM EMPLOYING AN INK MODEL

FIELD OF THE INVENTION

The invention relates to the field of image reproduction, and in particular, to digital halftoning.

BACKGROUND

Halftoning is a process by which continuous tone images are approximated by a pattern of pixels that can achieve only a limited number of discrete intensities. An example of this is the rendering of gray tones with black and white pixels, such as in a newspaper photograph. A halftone pattern is made up of a region of pixels referred to as a halftone cell. In conventional digital halftoning (e.g., halftoning that uses rational tangent angles), a halftone cell includes a specific, repeatable pattern. The discrete number of tonal levels of a halftone pattern depends upon the number of pixels in the halftone cell and the number of exposure levels or dot sizes for each pixel.

Halftones yield different optical densities on different paper types, depending on paper characteristics (e.g., coating, pulp, and chemicals used in the manufacturing process). Thus, using an ink jet printer for the same amount of ink at each gray level, the resultant optical densities may be different for each paper type. High speed production printer facilities use a variety of papers to accommodate print jobs. In some instances, the same print job may need to be printed on different paper at different print sites, with the objective of the visual appearance of the jobs to be the same. Such an objective may prove difficult in cases where custom color profiles are not used and device color printing is employed.

Because the same halftones are typically used in the above-described instance, a different appearance is produced for different paper types. Thus, calibration is performed to achieve desired results. However, conventional calibration approaches require a significant number of measurements.

Accordingly, an improved halftone calibration mechanism is desired.

SUMMARY

In one embodiment, a printing system is disclosed. The printing system includes a halftone calibration system that receives one or more un-calibrated halftones, generates one or more calibrated halftones from the one or more un-calibrated halftones, analyzes a printed calibration screen of the one or more calibrated halftones, and performs a halftone calibration.

In a further embodiment, a method is disclosed including receiving one or more un-calibrated halftones, generating one or more calibrated halftones from the one or more un-calibrated halftones, analyzing a printed calibration screen of the one or more calibrated halftones, and performing a halftone calibration.

BRIEF DESCRIPTION OF THE DRAWINGS

A better understanding of the present invention can be obtained from the following detailed description in conjunction with the following drawings, in which.

DETAILED DESCRIPTION

A halftone calibration mechanism using optical density and ink coverage is described. In the following description, for the purposes of explanation, numerous specific details are set forth to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
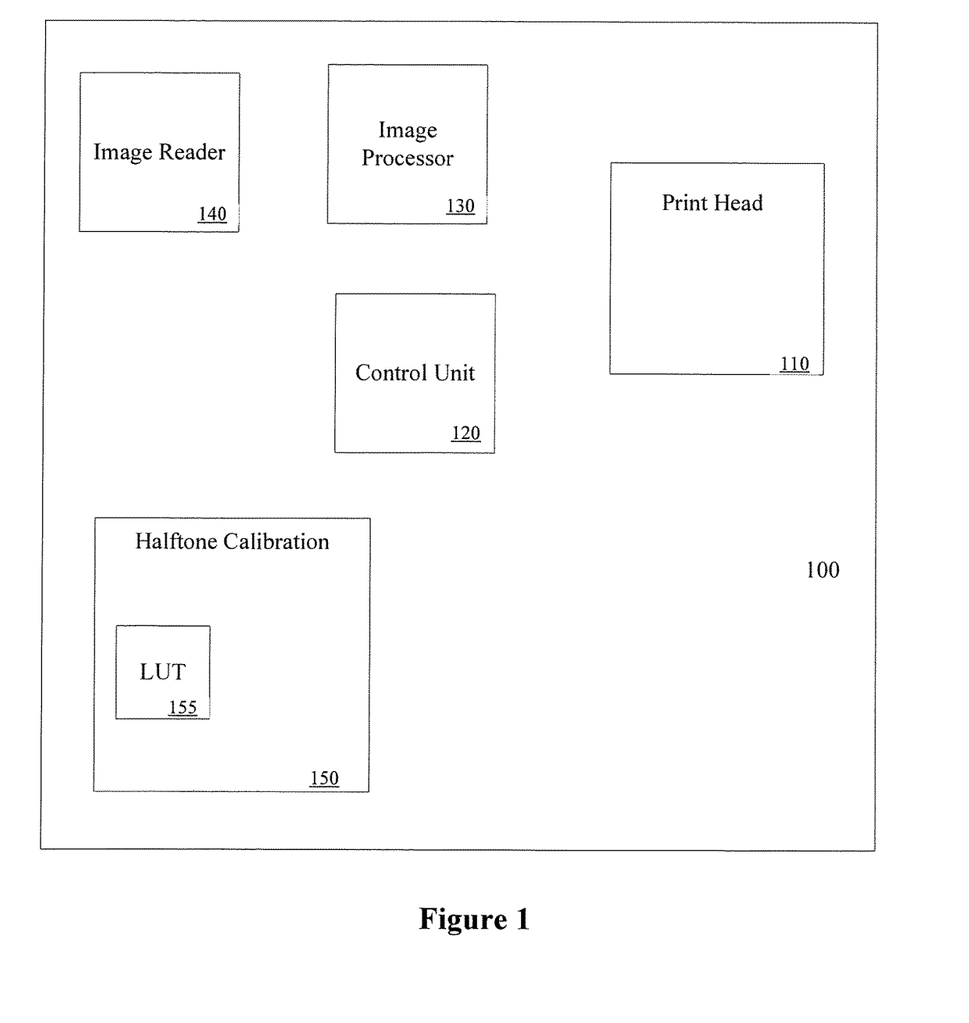
FIG. 1 illustrates one embodiment of a printer.

FIG. 1 illustrates one embodiment of a printer 100. Printer 100 includes a print head 110, control unit 120, image processor 130, image reader 140 and a calibration system 150. Print head 110 includes a printing element that prints to a print medium. In one embodiment, print head 110 is an inkjet print head that is implemented to write image data onto a print medium.

Control unit 120 controls the operation of print head 110, while image processor 130 performs rasterization of image data received at printer 100. Rasterization converts information received at printer 100 into a raster format. Particularly, image processor 130 generates a raster scan of a received image that is to be stored as scan line data in a memory array. Subsequently, image processor 130 performs halftone processing of the scan line data stored in the memory array. Control unit 120 also verifies the output of print head 110 upon receiving image data captured by image reader 140.

Printer 100 also includes a halftone calibration system 150. Calibration system 150 implements an ink model to provide an accurate description as to how an ink interacts with a particular medium (e.g., paper). Although shown as residing a component of printer 100, other embodiments may feature halftone calibration system 150 as an independent device, or combination of devices, that is communicably coupled to printer 100.

Figure 2:
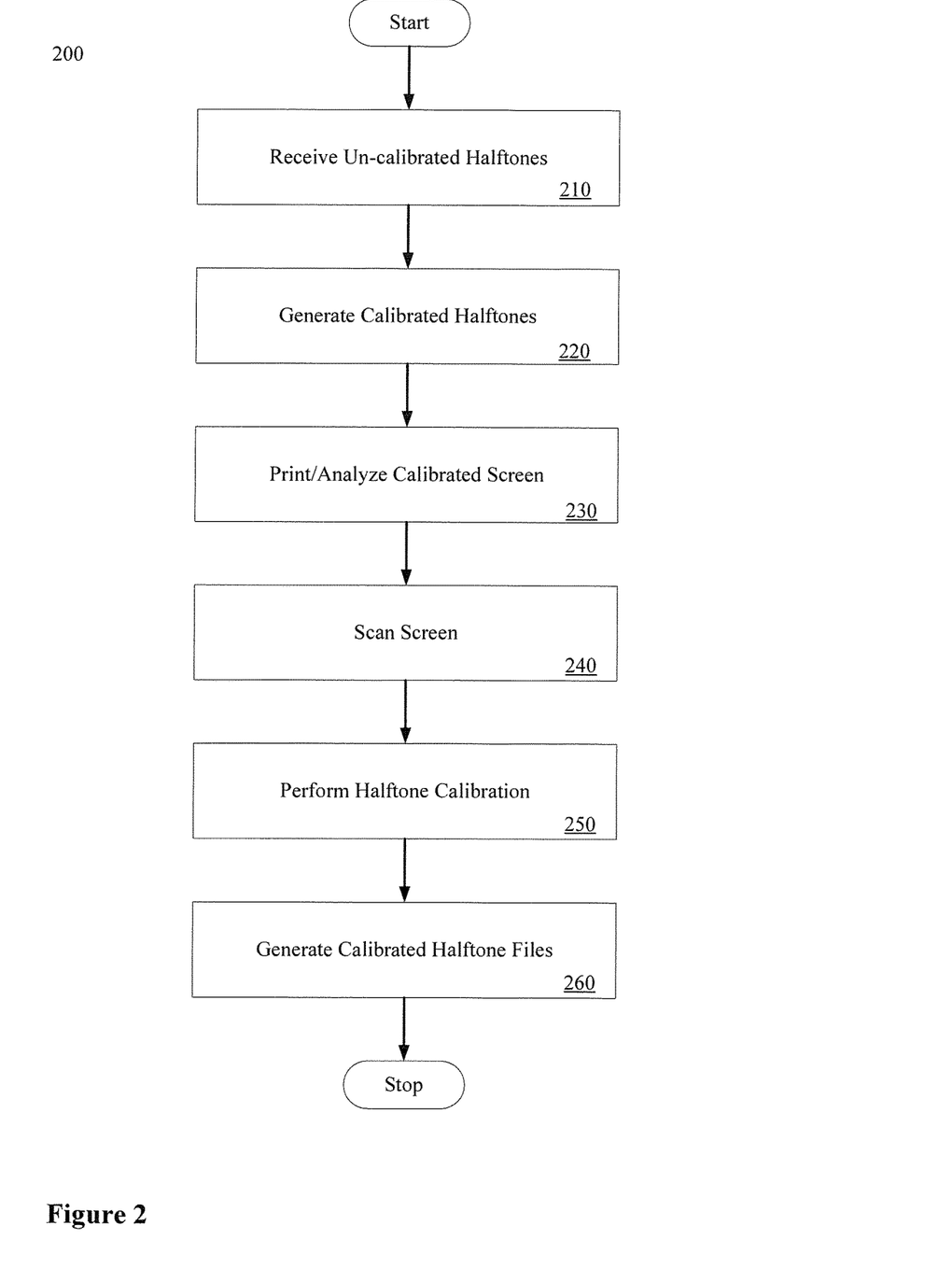
FIG. 2 is a flow diagram illustrating one embodiment of a halftone calibration process.

FIG. 2 is flow diagram illustrating one embodiment of a process 200 for halftone calibration. Process 200 may be performed by processing logic that may include hardware (e.g., circuitry, dedicated logic, programmable logic, microcode, etc.), software such as instructions run on a processing device, or a combination thereof. In one embodiment, process 200 is performed by halftone calibration system 150.

At processing block 210, un-calibrated halftones are received at calibration system 150. In one embodiment, the un-calibrated halftones are 10 bit (or higher) depth halftones. Although printer 100 implements 8 bit halftones, a higher bit halftone is used at block 210 to prevent a loss of bit depth during sampling. At processing block 220, 8-bit theoretically calibrated halftones are generated.

In one embodiment, the initial calibrated halftones are generated based on the ink model parameters without printing and measuring, so as to create an initial halftone which is theoretically generated without performing typical printing and measuring steps. In such an embodiment, the calibrated halftones are based on theoretical estimates of optical density (OD) versus ink coverage e.g., Modified Weibull like cumulative distribution function (CDF).

Weibull CDF describes the probability that a real-valued random variable X with a given probability distribution will be found at a value less than or equal to x (where x is a one possible value of the random variable X). Intuitively, it is the "area so far" function of the probability density function (PDF). Cumulative distribution functions are also used to specify the distribution of multivariate random variables.

Figure 3:
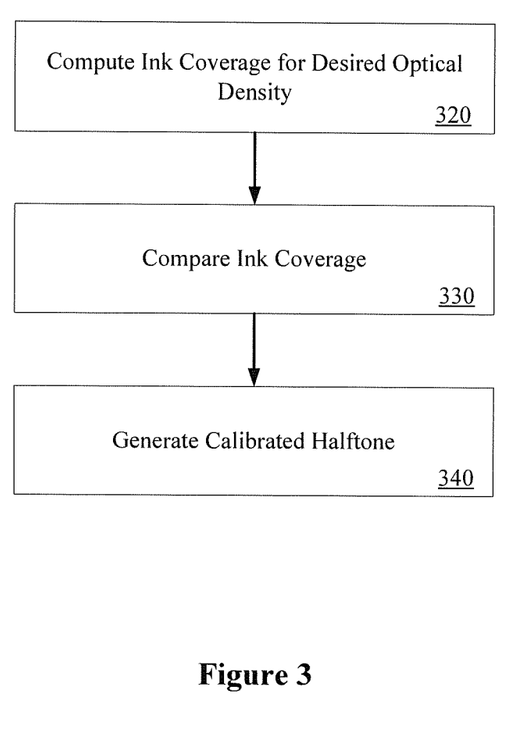
FIG. 3 is a flow diagram illustrating one embodiment of generating a theoretically calibrated halftone.

In one embodiment, the Weibull CDF is modified to incorporate paper white and the solid area maximum optical density. This modified Weibull CDF will be described as simply "Weibull CDF". The forward Weibull CDF relates ink coverage to OD, while the inverse Weibull CDF relates OD to ink coverage. FIG. 3 is a flow diagram illustrating one embodiment of generating theoretically calibrated halftones from un-calibrated halftones using an ink model. In one embodiment, ink coverage is represented by $$\text{Ink Coverage} = \frac{\text{Total Ink Mass}}{\text{Area}},$$

$$\text{Total Ink Mass} = \sum_{Area} \text{Drop sizes milligrams}$$

Ink coverage is defined as the total ink mass applied to a unit area. Since the halftone is tiled over the image area, which creates a uniform ink coverage over an area for a given pattern or gray level, ink coverage may be directly computed using LUT 155. In this case the individual patterns described by the LUT are converted to ink mass based on the mass of each drop within the pattern. The mass for every pattern is combined with the, printer resolution and LUT array size such that:

$$\text{Ink Coverage} = \frac{\text{Total Ink Mass}}{\frac{\text{Halftone } LUT \text{ row dimension}}{\text{Printer resolution (Scan direction)}} \times \frac{\text{Halftone } LUT \text{ column dimension}}{\text{Printer Resolution (Paper direction)}}}$$

This provides the ink coverage per unit area for each pattern of LUT 155. Each pattern, described as planes of the LUT, represent a different gray level. At processing block 320, ink coverage is computed for a desired OD value associated with a gray level using the inverse Weibull CDF relationship. In one embodiment, the ink coverage is computed using a sigmoidal target OD curve, which represents the theoretical OD target for each gray level.

Figure 4:
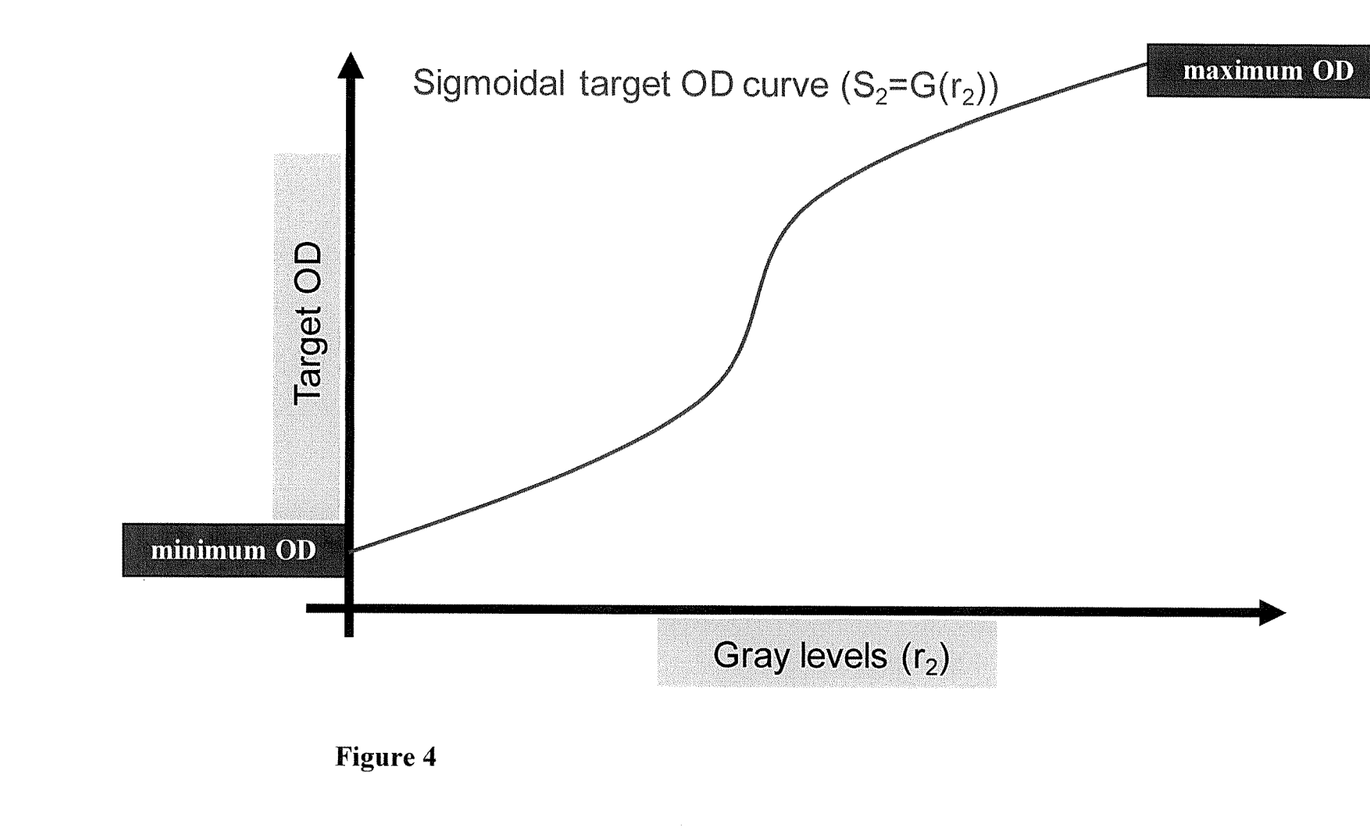
FIG. 4 illustrates one embodiment of sigmoidal target optical density curve.

FIG. 4 illustrates one embodiment of sigmoidal target OD curve mapped on a line chart having gray levels on the x-axis and desired OD values on the y-axis. In one embodiment, the maximum OD of the Sigmoidal curve is derived from the maximum ink coverage of the un-calibrated halftone and the Weibull forward relationship to constrain the end points of the functions to the same value.

At processing block 330, the ink coverage from block 320 is compared to the ink coverage computation from LUT 155. The planes of the LUT describe the discrete patterns associated with each gray level. Each pattern will therefore have a discrete amount of ink coverage based on the mass of the individual drops making up the patterns.

The pattern having ink coverage closest to the required ink coverage from block 320, is selected in this process. This process is repeated for each gray level of the halftone, and determines a mapping between the un-calibrated halftone and the theoretical target. In one embodiment, the uncalibrated halftone has more patterns than is required in the calibrated halftone so as to provide different ink coverages for each gray level which maximizes the number of gray levels in the halftone design.

Figure 5A:
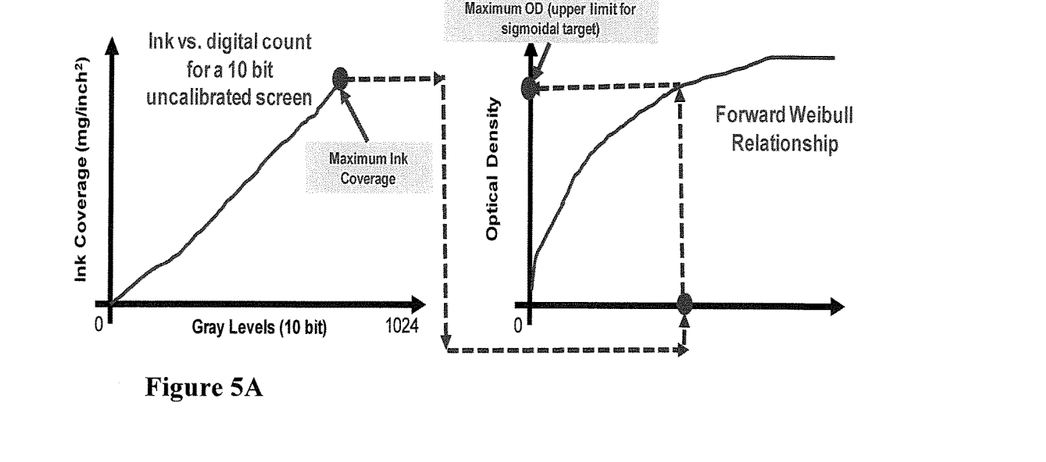
FIGS. 5A-5C illustrate embodiments of graphs for applications of an ink model.

FIG. 5A are graphs illustrating one embodiment of a forward Weibull relationship between OD versus ink coverage. In one embodiment, a four parameter Weibull model is implemented using OD=$(p(3)*(1-\exp^{((-x/p(1))^\wedge p(2))}))+p(4)$. The model that is employed is a modified version of a two parameter Weibull CDF.

In such an embodiment, the two parameter Weibull CDF function has been extended to four parameters to create a paper-ink model. The two additional parameters allow the model to account for paper white and absolute paper referenced OD, where x=ink coverage mass per area, p(1)=ink mass per area scale factor, which is similar to the Weibull scale factor in the way it influences the shape of the function, p(2)=slope factor.

This factor influences the shape of the function similarly to the Weibull slope factor, p(3)=maximum paper referenced OD and p(4)=paper white OD. Slope factors p(1) and p(2) are the parameters used in a two parameter Weibull CDF function. The p(1) scale factor adjusts the shape of the curve so as to modify how much ink coverage is required to achieve various ODs. Higher values for p(1) require more ink coverage to achieve higher OD.

Figure 5B:
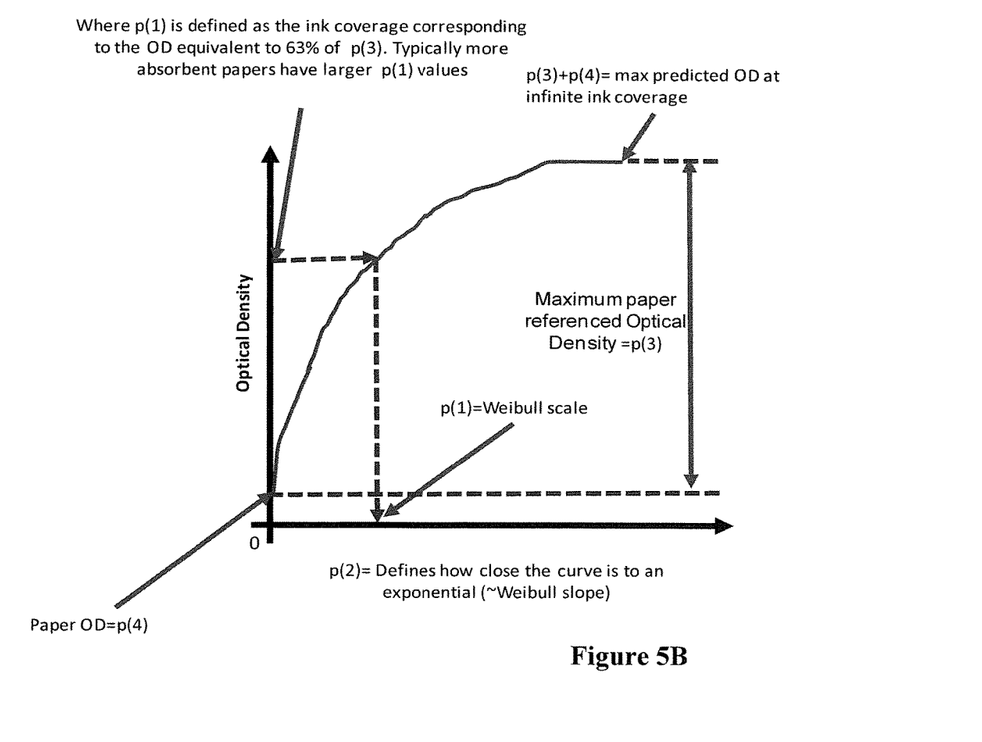

In addition, since p(1) is similar to two parameter Weibull slope, it indicates the point of the curve where the ink coverage is approximately 63% of the paper referenced maximum OD, parameter p(3). The model provides a value for the maximum absolute OD for the ink/paper. This maximum OD will be given by the sum of the p(3) and p(4) parameters. FIG. 5B is a graph illustrating the four Weibull parameters.

Figure 5C:
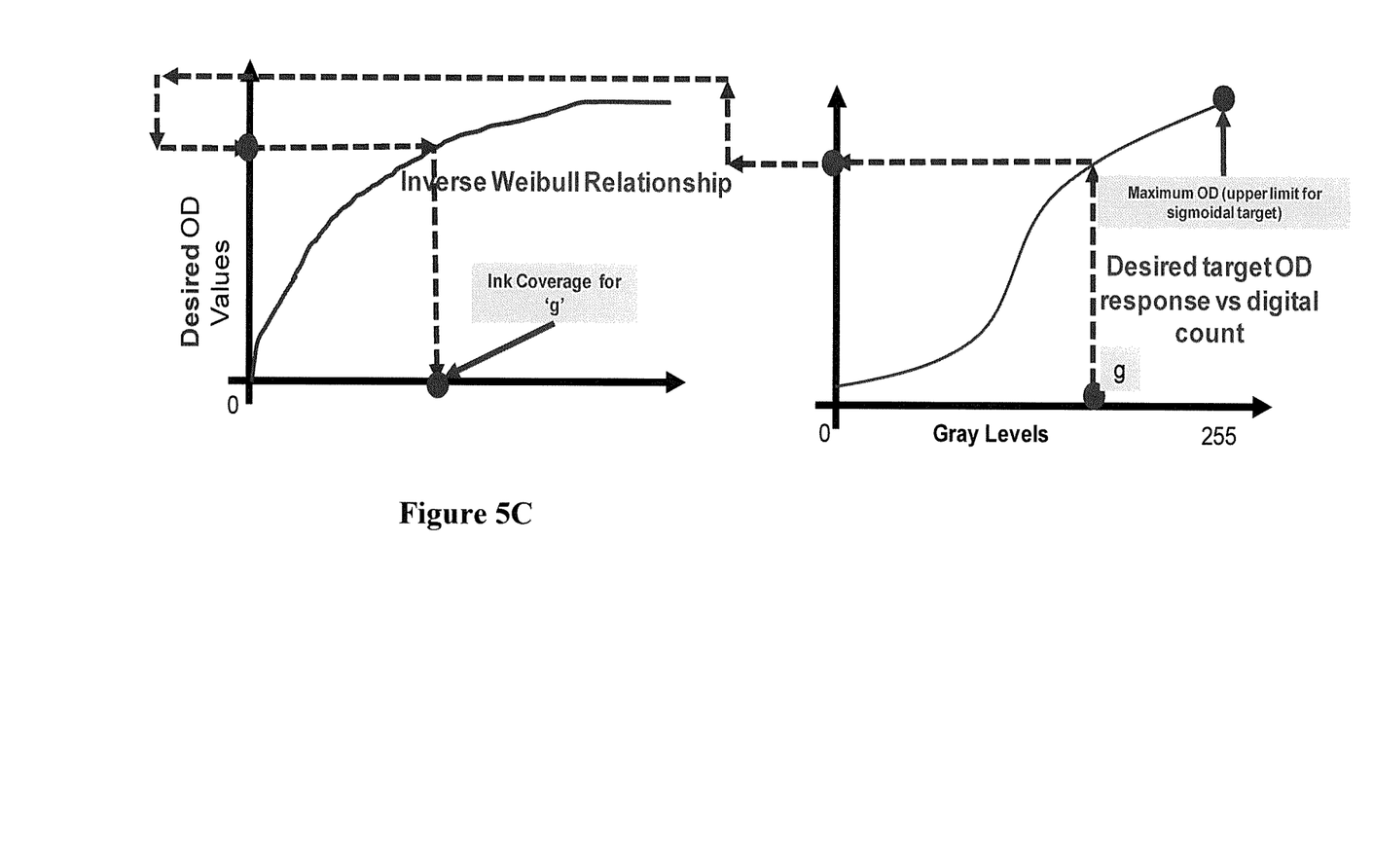

Inverse calculations are implemented to use the ink model for calibration purposes. An inverse application of the ink model may be implemented as shown in FIG. 5C. In such an embodiment, ink usage (x), for a given OD and parameter set p(1),p(2),p(3) and p(4), has a solution:

$x=\exp^{((ln(-ln(1-((OD-p(4))/p(3))))/p(2))}+\ln(p(1)))\rightarrow$Inverse Relationship; or equivalently $x=10^{((log(-ln(1-((OD-p(4))/p(3))))/p(2))}+\log(p(1)))\rightarrow$Inverse Relationship, where 'ln' is natural log and 'log' is logarithm base 10.

Referring back to FIG. 3, the theoretically calibrated halftone is generated at processing block 340 once the ink coverage is computed using the inverse Weibull. Referring to FIG. 5C, to generate a theoretically calibrated halftone, gray level g is selected from the range of values for the desired calibrated halftone. For an eight bit system this would be levels from 255 through 0. For each gray level g the Optical Density is computed using a target function such as Sigmoidal.

For each OD value the corresponding ink coverage is determined using the inverse Weibull relationship. This is then used in FIG. 3 to determine the patterns for each gray level g to create the calibrated halftone LUT. Once the calibrated screen is created it is printed as shown in FIG. 2, processing block 230.

At processing block 240, the printed screen is scanned by image reader 140 and analyzed by halftone calibration system 150. In one embodiment, the printed screen is analyzed by calculating mean OD for each nozzle (e.g., 20%, 30%, 40%, 60%, 80% tints and white paper) in print head 110, deriving corresponding ink coverage per nozzle, predicting ODs for tint values from 0-100% (0-255 gray levels) and generating a sigmoidal target OD curve based on measured/predicted data.

At processing block 250, a practical halftone calibration based on the measured OD estimates is performed. In one embodiment, the practical halftone calibration is performed by generating tone reproduction curves. At processing block 260, calibrated halftone files are generated. This process usually involves converting the LUT representation of the halftone to a threshold array.

Figure 6:
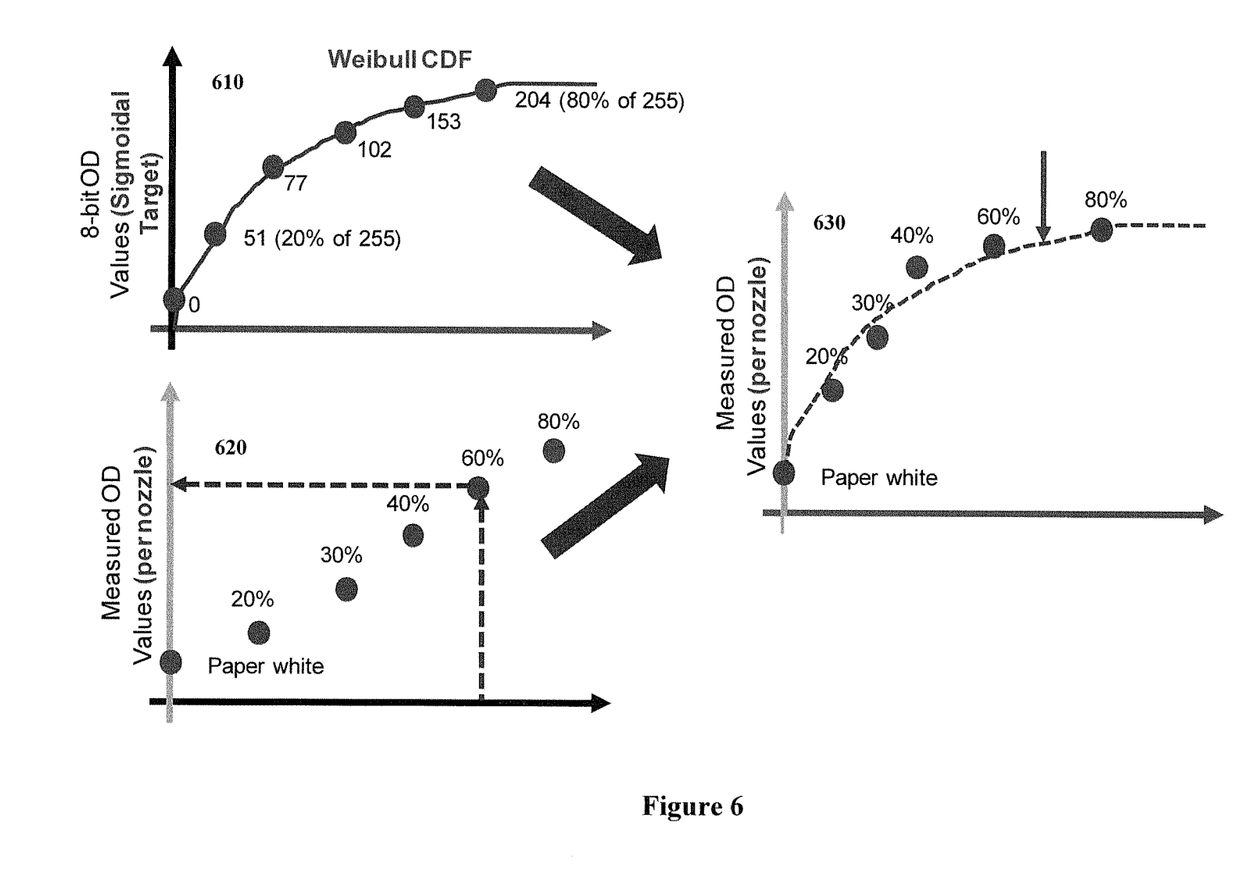
FIG. 6 illustrates one embodiment of a graph for theoretical halftone calibration using optical density and ink coverage.

FIG. 6 illustrates one embodiment of graphs for halftone calibration using optical density and ink coverage. Graph 610 illustrates OD values versus ink coverage from the Weibull calculation, while graph 620 illustrates measured OD values per ink nozzle from the printed screen versus tint level. The values from graph 610 and 620 are subsequently used to calculate a best fit Weibull CDF per nozzle as shown in graph 630.

Figure 7:
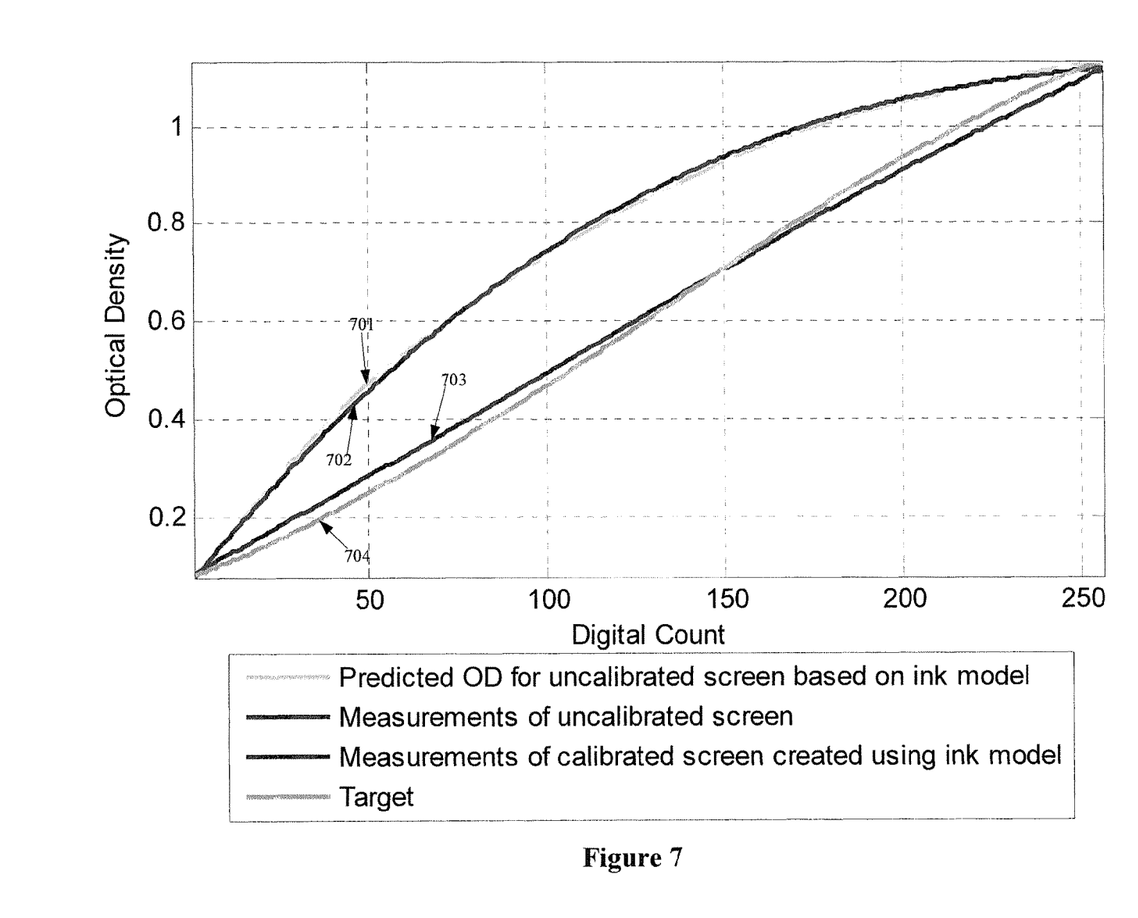
FIG. 7 illustrates another embodiment of a graph of theoretical halftone optical density using an ink coverage model in comparison to measured results for the same halftone designs.

FIG. 7 illustrates another embodiment of a graph for halftone calibration using optical density and ink coverage, where line 701 represents predicted OD for an un-calibrated screen as predicted based on an ink model, line 702 represents measurements of the same un-calibrated screen, line 703 represents measurements of a practically calibrated screen using the ink model for a screen calibrated to a sigmoidal target and line 704 represents the target (e.g., sigmoidal).

In these cases patches created using the patterns for the uncalibrated or calibrated halftone are employed either to determine the ink coverage and predicted OD from the ink model, or to generate the dots for the printed charts. Therefore the ink model approach can be used macroscopically to calibrate a halftone or "microscopically" to calibrate to characteristics of a halftone on a per nozzle basis.

Figure 8:
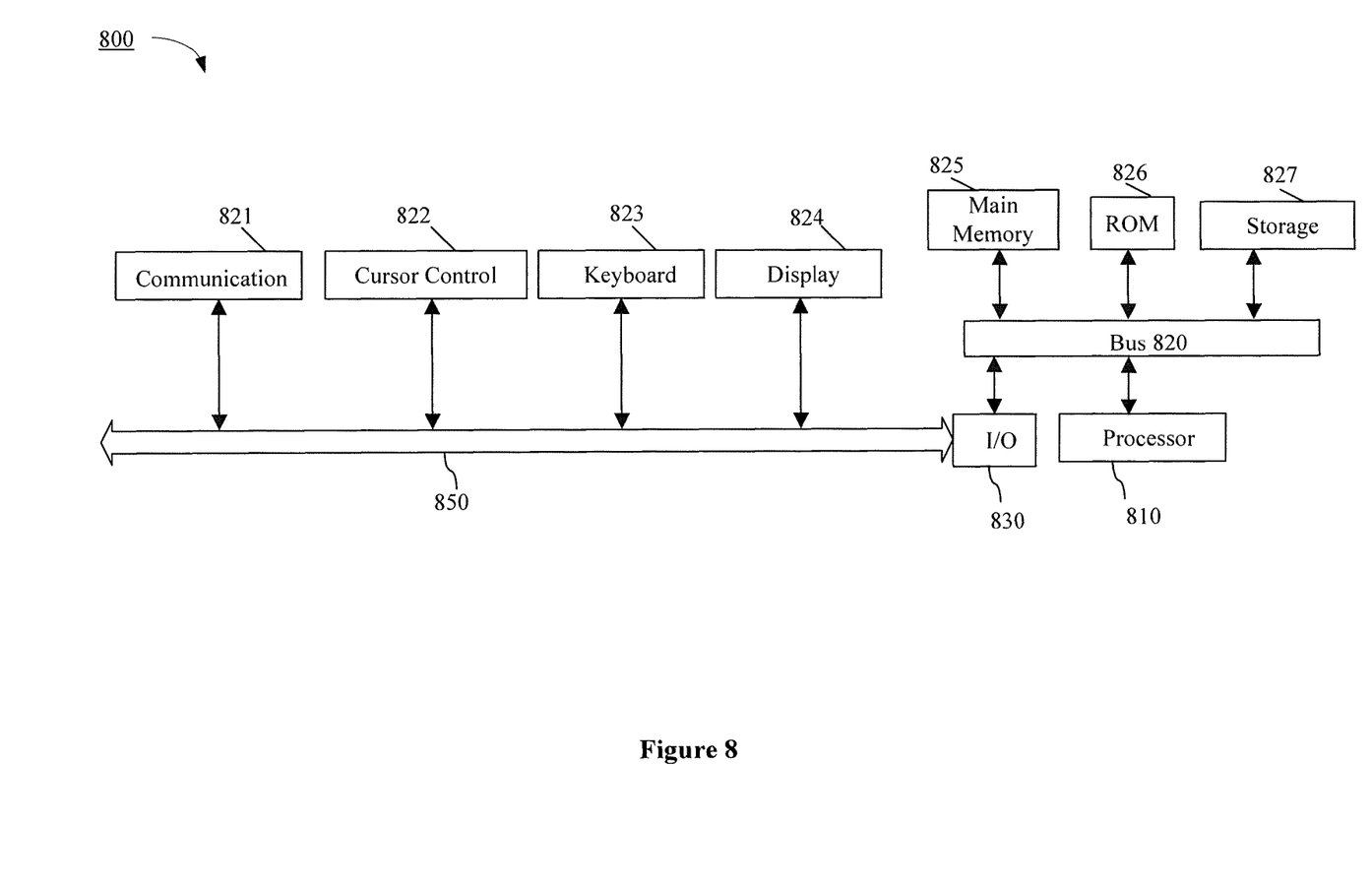
FIG. 8 illustrates one embodiment of a computer system.

FIG. 8 illustrates a computer system 800 on which printer 100 and/or halftone calibration system 150 may be implemented. Computer system 800 includes a system bus 820 for communicating information, and a processor 810 coupled to bus 820 for processing information.

Computer system 800 further comprises a random access memory (RAM) or other dynamic storage device 825 (referred to herein as main memory), coupled to bus 820 for storing information and instructions to be executed by processor 810. Main memory 825 also may be used for storing temporary variables or other intermediate information during execution of instructions by processor 810. Computer system 800 also may include a read only memory (ROM) and or other static storage device 826 coupled to bus 820 for storing static information and instructions used by processor 810.

A data storage device 825 such as a magnetic disk or optical disc and its corresponding drive may also be coupled to computer system 800 for storing information and instructions. Computer system 800 can also be coupled to a second I/O bus 850 via an I/O interface 830. A plurality of I/O devices may be coupled to I/O bus 850, including a display device 824, an input device (e.g., an alphanumeric input device 823 and or a cursor control device 822). The communication device 821 is for accessing other computers (servers or clients). The communication device 821 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A non-transitory machine-readable medium including data that, when accessed by a machine, cause the machine to perform operations comprising:
   receiving one or more un-calibrated halftones;
   generating one or more calibrated halftones from the one or more un-calibrated halftones employing an ink model by:
      computing ink coverage for the one or more un-calibrated halftones;
      computing ink coverage for a desired optical density; and
      comparing the computed ink coverage for the one or more un-calibrated halftones with the computed ink coverage for the desired target optical density,
   wherein ink coverage is defined as a total ink mass applied to a unit area;
   analyzing a printed calibration screen of the one or more calibrated halftones; and
   performing a halftone calibration.

2. The article of manufacture of claim 1 wherein the ink coverage for the one or more un-calibrated halftones is computed using a lookup table.

3. The article of manufacture of claim 2 wherein the ink coverage for the desired optical density is computed using a sigmoidal optical density curve.

4. The article of manufacture of claim 3 wherein comparing the computed ink coverage for the one or more un-calibrated halftones with the computed ink coverage for the desired optical density comprises determining a mapping between the one or more un-calibrated halftones and the sigmoidal optical density curve.

5. The article of manufacture of claim 4 wherein the mapping is computed using a four parameter Weibull cumulative distribution function.

6. The article of manufacture of claim 1 wherein analyzing the calibrated screen comprises calculating a mean optical density for each nozzle in a print head, deriving corresponding ink coverage per nozzle, predicting optical densities for tint values based on a sigmoidal target optical density curve using measured and predicted data.

7. The article of manufacture of claim 1 wherein performing the halftone calibration comprises generating tone reproduction curves.

8. The article of manufacture of claim 1 comprising a machine-readable medium including data that, when accessed by a machine, further causes the machine to perform operations comprising generating one or more calibration halftone files.

9. A printing system comprising:
a halftone calibration system to receive one or more un-calibrated halftones, generate one or more calibrated halftones from the one or more un-calibrated halftones by computing ink coverage for the one or more un-calibrated halftones, computing ink coverage for a desired optical density and comparing the computed ink coverage for the one or more un-calibrated halftones with the computed ink coverage for the desired target optical density, analyze a printed calibration screen of the one or more calibrated halftones, and perform a halftone calibration, wherein ink coverage is defined as a total ink mass applied to a unit area.

10. The printing system of claim 9 wherein the ink coverage for the one or more un-calibrated halftones is computed using a lookup table and the ink coverage for the desired optical density is computed using a sigmoidal optical density curve.

11. The printing system of claim 10 wherein comparing the computed ink coverage for the one or more un-calibrated halftones with the computed ink coverage for the desired optical density comprises determining a mapping between the one or more un-calibrated halftones and the sigmoidal optical density curve.

12. The printing system of claim 11 wherein the mapping is computed using a Weibull four parameter cumulative distribution function.

13. The printing system of claim 9 wherein analyzing the calibration screen comprises calculating a mean optical density for each nozzle in a print head, deriving corresponding ink coverage per nozzle, predicting optical densities for tint values employing a sigmoidal target optical density curve, based on measured and predicted data.

14. The printing system of claim 9 wherein performing the halftone calibration comprises generating tone reproduction curves.

15. The printing system of claim 14 wherein generating tone reproduction curves comprises performing single pass calibration across a medium web and performing dual pass calibration for overlap print head nozzles.

16. The printing system of claim 9 wherein the halftone calibration system generates one or more calibration halftone files.

17. The printing system of claim 9 wherein one or more un-calibrated halftones are 10 bit halftones and the one or more calibrated halftones are 8 bit halftones.

18. A method comprising:
receiving one or more un-calibrated halftones;
generating one or more calibrated halftones from the one or more un-calibrated halftones employing an ink model by:
computing ink coverage for the one or more un-calibrated halftones;
computing ink coverage for a desired optical density; and
comparing the computed ink coverage for the one or more un-calibrated halftones with the computed ink coverage for the desired target optical density,
wherein ink coverage is defined as a total ink mass applied to a unit area;
analyzing a printed calibration screen of the one or more calibrated halftones; and
performing a halftone calibration.

* * * * *

UNITED STATES PATENT AND TRADEMARK OFFICE
CERTIFICATE OF CORRECTION

PATENT NO. : 9,621,762 B2  
APPLICATION NO. : 13/346231  
DATED : April 11, 2017  
INVENTOR(S) : Chandu et al.

Page 1 of 1

It is certified that error appears in the above-identified patent and that said Letters Patent is hereby corrected as shown below:

In the Specification

In Column 2, Line 56, delete "residing" after although shown as

In Column 4, Line 43, insert -- the -- after is similar to

In Column 5, Line 66, insert -- 827 -- after a data storage device and delete "825"

Signed and Sealed this
Twenty-fifth Day of July, 2017

Joseph Matal
*Performing the Functions and Duties of the*
*Under Secretary of Commerce for Intellectual Property and*
*Director of the United States Patent and Trademark Office*